US009704397B1

(12) United States Patent
Bjorklund et al.

(10) Patent No.: US 9,704,397 B1
(45) Date of Patent: Jul. 11, 2017

(54) APPARATUS FOR USE IN A WARNING SYSTEM TO NOTIFY A LAND VEHICLE OR A MOTORIST OF THE VEHICLE OF AN APPROACHING OR NEARBY EMERGENCY VEHICLE OR TRAIN

(71) Applicant: Global IP Holdings, LLC, Sterling Heights, MI (US)

(72) Inventors: Paul Bjorklund, Linden, MI (US); Darius J. Preisler, Macomb, MI (US); David R. Syrowik, Milford, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 15/090,766

(22) Filed: Apr. 5, 2016

(51) Int. Cl.
*G08G 1/00* (2006.01)
*G08G 1/0965* (2006.01)
*B60Q 9/00* (2006.01)

(52) U.S. Cl.
CPC ............. *G08G 1/0965* (2013.01); *B60Q 9/00* (2013.01)

(58) Field of Classification Search
CPC ........ G08G 1/0965; G08G 1/205; B60Q 9/00; B60Q 5/006
USPC .................................. 340/901–905, 936, 937
See application file for complete search history.

(56) References Cited

U.S. PATENT DOCUMENTS

| 4,238,778 | A | 12/1980 | Ohsumi | |
|---|---|---|---|---|
| 5,572,201 | A * | 11/1996 | Graham | G08G 1/0965 340/901 |
| 6,222,461 | B1 | 4/2001 | Hazen | |
| 6,362,749 | B1 * | 3/2002 | Brill | G08G 1/0965 174/36 |
| 6,822,580 | B2 | 11/2004 | Ewing et al. | |
| 7,061,402 | B1 * | 6/2006 | Lawson | G08G 1/0965 340/901 |
| 7,271,736 | B2 | 9/2007 | Siegel et al. | |
| 7,538,687 | B2 * | 5/2009 | McKenna | G08G 1/0965 340/901 |
| 8,350,721 | B2 | 1/2013 | Carr | |
| 8,659,841 | B2 | 2/2014 | Enomoto | |
| 9,201,270 | B2 | 12/2015 | Fattal et al. | |
| 2005/0239436 | A1 * | 10/2005 | Bell | B60K 28/00 455/404.2 |
| 2007/0159354 | A1 | 7/2007 | Rosenberg | |

(Continued)

OTHER PUBLICATIONS

Office Action, U.S. Appl. No. 15/045,862, filed Feb. 17, 2016, notification date: Mar. 23, 2017.

*Primary Examiner* — Tai T Nguyen
(74) *Attorney, Agent, or Firm* — Brooks Kushman P.C.

(57) ABSTRACT

Apparatus for use in a warning system to notify a land vehicle or a motorist of the vehicle of an approaching or nearby emergency vehicle or train is provided. In one embodiment, the apparatus includes a docking station and a communication device which has a first receiver which receives RF warning signals transmitted from outside the land vehicle and a second receiver which receives perceptible warning signals transmitted by the emergency vehicle or train. The docking station supports the device within the passenger compartment so that the first and second receivers are capable of receiving the RF and perceptible warning signals, respectively. Control logic is coupled to the device to generate a notification signal based on the warning signals. The notification signal provides an advance warning to the motorist or land vehicle.

18 Claims, 9 Drawing Sheets

(56) References Cited

U.S. PATENT DOCUMENTS

| | | |
|---|---|---|
| 2007/0200672 A1 | 8/2007 | McBride et al. |
| 2009/0174572 A1 | 7/2009 | Smith |
| 2009/0243796 A1 | 10/2009 | Tieman |
| 2011/0018736 A1 | 1/2011 | Carr |
| 2012/0262540 A1 | 10/2012 | Rondinelli et al. |
| 2013/0235149 A1 | 9/2013 | Tanaka et al. |
| 2013/0321581 A1 | 12/2013 | El-Ghoroury et al. |
| 2014/0146133 A1 | 5/2014 | Nikonov et al. |
| 2016/0009222 A1* | 1/2016 | Taylor ............... G08G 1/0965 340/902 |

\* cited by examiner

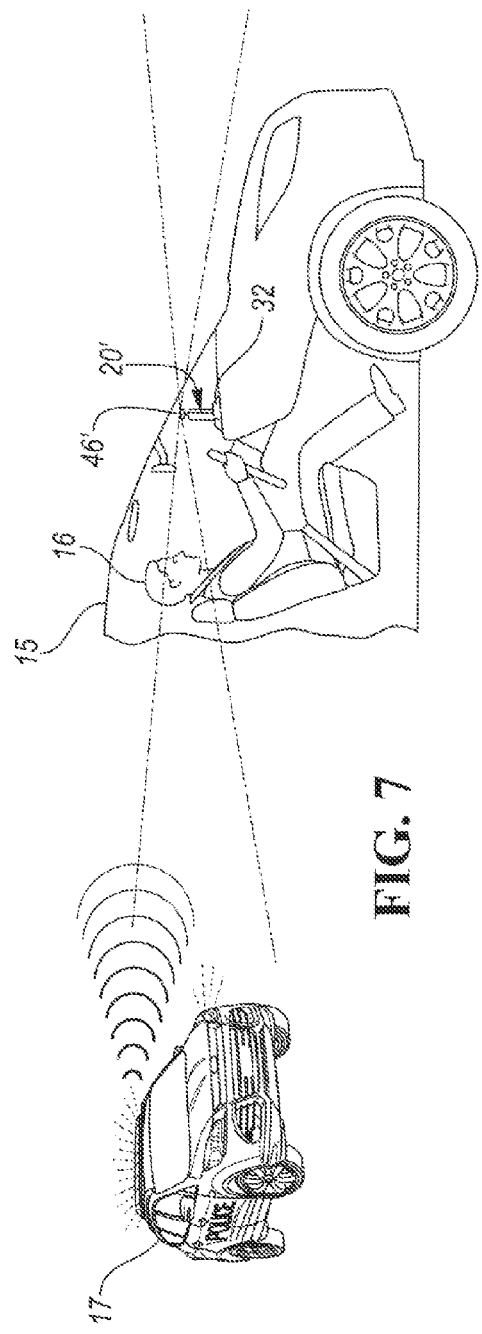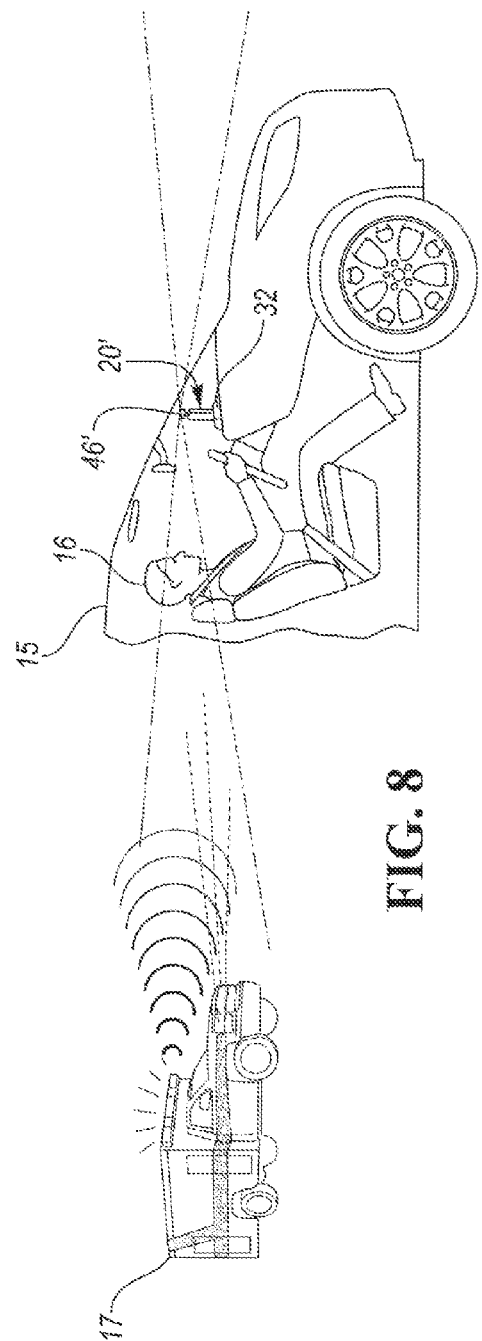

APPARATUS FOR USE IN A WARNING SYSTEM TO NOTIFY A LAND VEHICLE OR A MOTORIST OF THE VEHICLE OF AN APPROACHING OR NEARBY EMERGENCY VEHICLE OR TRAIN

TECHNICAL FIELD

This invention relates to an apparatus for use in warning systems to notify land vehicles or motorists of the vehicles of an approaching or nearby emergency vehicle or train.

Overview

As described in U.S. Pat. No. 8,350,721, emergency responder vehicles typically rely on general indicators, such as sirens and/or colored lights, to alert others as the emergency responder vehicle approaches. These indicators may provide insufficient time to allow other vehicles to effectively clear an approach path for the emergency responder vehicle. Furthermore, drivers of other vehicles may not be able to determine the approach direction of an emergency responder vehicle, which may make it difficult to anticipate what appropriate action (if any) is necessary to clear an approach path for the emergency responder vehicle As described in U.S. Pat. No. 7,271,736, various methods and devices have been used to transmit a signal or warning from an emergency vehicle to nearby vehicles, such as the siren of a fire truck or ambulance. Another method involves sending a signal from the emergency vehicle to the traffic light at an upcoming intersection. The traffic light is programmed to turn red in all directions when the traffic light receives the signal.

Sirens have several disadvantages. The volume of the siren limits the distance at which the siren can be heard. Excessive volume can be damaging to the ears of commuters, pedestrians, and the occupants of the emergency vehicle. An additional disadvantage of siren alerts is that commuters have difficulty discerning how many emergency vehicles are in the area or knowing the direction the emergency vehicles are traveling. One emergency vehicle sounding a siren can pass by the commuter vehicle. The commuter may erroneously assume that only one emergency vehicle is in the vicinity and resume travel on the road once the first emergency vehicle passes. In many circumstances, a second emergency vehicle is traveling some distance behind the first emergency vehicle, catching the commuter unaware as he or she enters the path of the second emergency vehicle. Such a situation can force the second emergency vehicle to swerve around the commuter's vehicle, creating a hazard to occupants of the commuter vehicle, the second emergency vehicle, as well as other vehicles in the vicinity.

Another disadvantage associated with the use of sirens is that many commuter vehicles are constructed with a much quieter interior than in past years. The quiet vehicles make it more difficult to hear outside noises, including the blare of a siren.

Yet another disadvantage of sirens is that the driver or motorist who should hear the siren may have his or her windows up, music blaring and perhaps he or she is engaged in a cell phone conversation. More people live in urban cities and fewer people reside in sparsely traveled rural areas. The cities are densely populated and noisy, which hinders the ability of drivers to adequately hear and discern the siren, above the loud background noises. Additionally, cities have large, tall buildings that block the transmission of the siren sound. The siren sound tends to be funneled down the street. The siren sound does not effectively go around corners. Sound waves can bounce off of buildings and travel around corners to a certain limit, but sound waves do have a tendency to continue travel in the preexisting unobstructed direction.

U.S. patent publication No. 2007/0159354 discloses an intelligent emergency vehicle alert system including a locative server in communication with processors of each of an emergency vehicle and a ground vehicle. The locative server repeatedly receives locative data from each of the emergency vehicle and the ground vehicle. The locative data indicates a substantially current geospatial location of the respective vehicle. An intelligent emergency vehicle alerting process is also provided. The process is operative to selectively alert a driver of the ground vehicle of a presence of the emergency vehicle. The alert is conveyed at least in part based upon a determined spatial proximity between the emergency vehicle and the ground vehicle. The alert may also be based upon a determination that the emergency vehicle and ground vehicle are traveling on the same road of travel, in the same direction of travel, and/or that the emergency vehicle is behind the ground vehicle As described in U.S. patent publication No. 2009/0174572, some if not most U.S. adults carry an active cell phone, or those driving and riding in vehicles.

Cell phones represent a technology which has already been widely implemented in most developed countries. Moreover, the life-cycle of a cell phone is far shorter than that of an automobile. Automobiles generally have a design life of 10-15 years, and thus new technology offered in automobiles may take a decade or more to work its way through the inventory of existing vehicles.

2009/0174572 discloses methods and apparatus to improve emergency vehicle deployment by automatically alerting all other nearby vehicles on the road as to the presence and intention of the emergency vehicle.

Cellular telephones relay an emergency vehicle's siren to help clear the road ahead for the emergency services vehicle. The method uses techniques to determine which cell users are in the path of the vehicle and targets only those cell devices to relay the siren. The relaying is virtual as it may use siren or similar ring-tones that respond to the emergency notification to the user's cell phone number. The method and apparatus makes use of calls, broadcasts, SMS messaging, text messaging, Push to Talk (PTT), emails, and other means of cell phone communication.

The following U.S. patent publications are related to at least one aspect of the present invention: U.S. Pat. Nos. 6,222,461; 6,822,580; 4,238,778; 2009/0174572; and 2011/0018736.

Despite the above art, there is still a need for a low cost apparatus for use in warning systems that can notify motorists and/or autonomous vehicles of an approaching emergency vehicle or train sooner than later so that the motorist and/or land vehicle can yield to the emergency vehicle or train sooner than later.

SUMMARY OF EXAMPLE EMBODIMENTS

An object of at least one embodiment of the present invention is to provide an apparatus for use in a warning system to notify a land vehicle or a motorist of the vehicle of an approaching or nearby emergency vehicle or train wherein existing radio frequency communication infrastructure and existing emergency vehicle and/or train warning devices can be utilized.

In carrying out the above object and other objects of at least one embodiment of the invention, an apparatus for use in a warning system to notify a land vehicle or motorist of the vehicle of an approaching or nearby emergency vehicle or train is provided. The apparatus includes a docking station and a communication device having a first receiver to receive RF warning signals transmitted from outside the vehicle and a second receiver to receive perceptible warning signals transmitted by the emergency vehicle or train. The docking station supports the device within a passenger compartment of the land vehicle so that the first and second receivers are capable of receiving the RF and perceptible warning signals, respectively. The apparatus further includes control logic coupled to the device to generate a notification signal based on the warning signals. The notification signal provides advance warning to the motorist or the land vehicle of the approaching or nearby emergency vehicle or train.

The device may include a visual display to provide visual information regarding the emergency vehicle or train to the motorist based on the notification signal. The visual display may be a light-field or holographic display and the visual information may be a 3D image.

The device may include a speaker or transducer to provide an acoustical signal to the motorist based on the notification signal.

The device may include a vibrating transducer to vibrate based on the notification signal.

The perceptible warning signals may be visually perceptible wherein the device includes an imaging assembly to image the visually perceptible signals to obtain a set of images and an image processor to process the set of images.

The perceptible warning signals may be audibly perceptible wherein the device includes a transducer for converting the audibly perceptible signals into electrical signals.

The docking station may be electrically coupled to the vehicle's electrical system.

The device may comprise a cellular phone configured to transmit and receive cell phone signals. The RF warning signals may include a signal which indicates that the emergency vehicle or train is located within a cell in which the land vehicle is located.

The docking station may include a device holder supported in spaced relationship relative to an interior component of the vehicle.

The imaging assembly may include a camera having a wide-angle lens system, an omnidirectional image capturing apparatus to create a panoramic image or a panoramic imaging system.

Further in carrying out the above object and other objects of at least one embodiment of the present invention, an apparatus for use in a warning system to provide advance warning of an approaching or nearby emergency vehicle or train is provided. The apparatus includes a hand-held communication device including a first receiver to receive RF warning signals and a second receiver to receive perceptible warning signals transmitted by the emergency vehicle or train. The apparatus further includes control logic coupled to the device to generate a notification signal based on the warning signals. The notification signal provides advance warning of the approaching or nearby emergency vehicle or train.

The device may include a visual display to provide visual information regarding the emergency vehicle or train based on the notification signal. The visual display may be a light-field or holographic display and the visual information may be a 3D image.

Still further in carrying out the above object and other objects of at least one embodiment of the present invention, an apparatus for use in a warning system to notify a land vehicle or motorist of the vehicle of an approaching or nearby emergency vehicle or train is provided. The apparatus includes a docking station and a cellular phone. The cellular phone includes a first receiver to receive visually perceptible warning signals transmitted by the emergency vehicle or train and a second receiver to receive audibly perceptible warning signals transmitted by the emergency vehicle or train. The docking station supports the cellular phone within a passenger compartment of the land vehicle so that the first and second receivers are capable of receiving the visually and audibly perceptible warning signals. The apparatus further includes control logic coupled to the receivers to generate a notification signal based on the visually and audibly perceptible warning signals. The notification signal provides advance warning to the motorist or the land vehicle of the approaching or nearby emergency vehicle or train.

The cellular phone may include a visual display to provide visual information regarding the emergency vehicle or train based on the notification signal. The visual display may be a light-field or holographic display and the visual information may be a 3D image.

BRIEF DESCRIPTION OF THE DRAWINGS

FIG. 7 is a view, similar to the view of FIG. 6, wherein the emergency vehicle is a police car;

FIG. 8 is a view, similar to the views of FIGS. 6 and 7, wherein the emergency vehicle is an ambulance;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
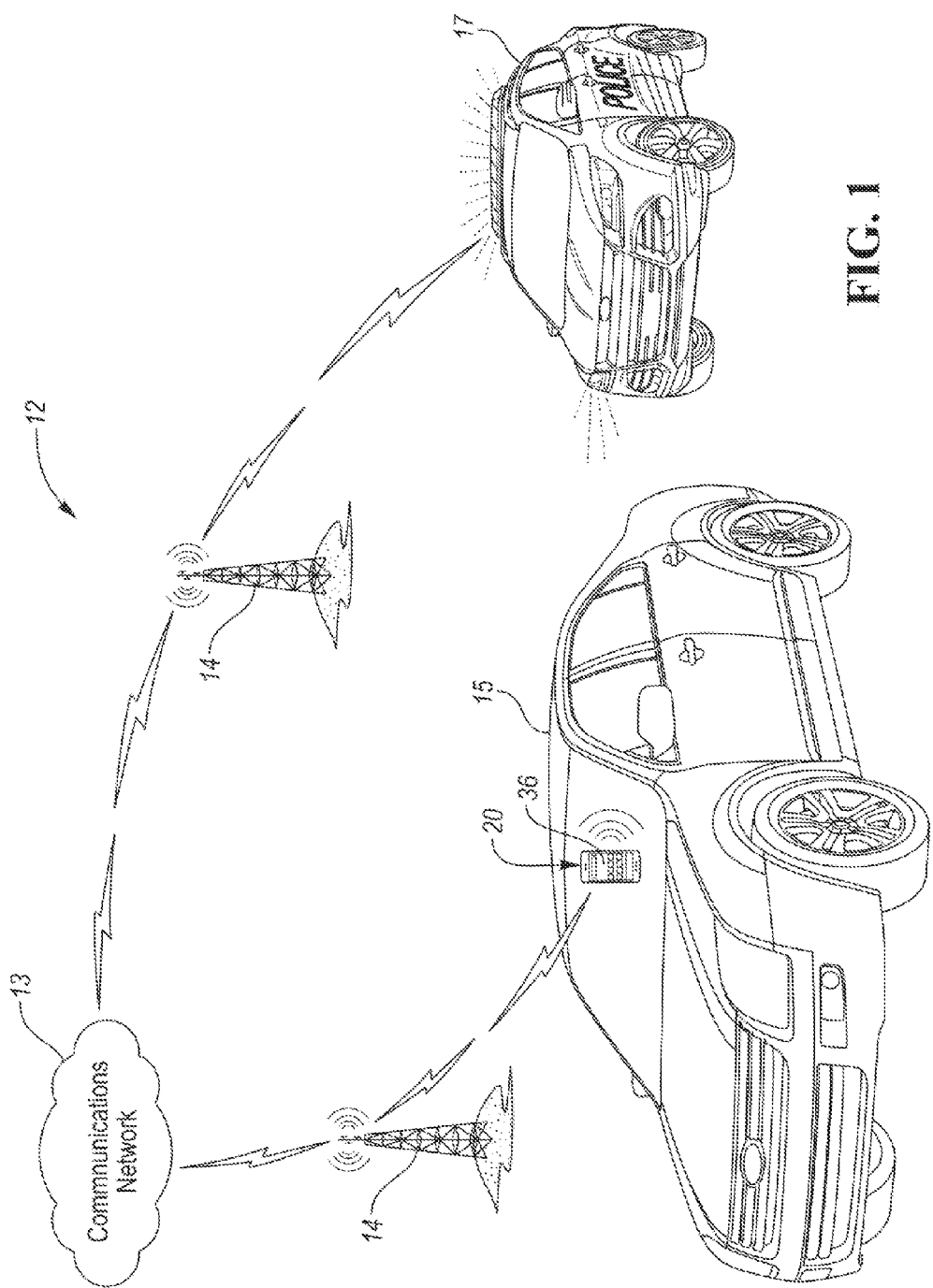
FIG. 1 is a schematic view of a warning system, including a communications network, a land vehicle and an approaching emergency vehicle wherein the warning system notifies the land vehicle or a motorist of the vehicle of the approaching vehicle via RF warning signals received by a cellular phone located within a passenger compartment of the land vehicle.
Figure 2:
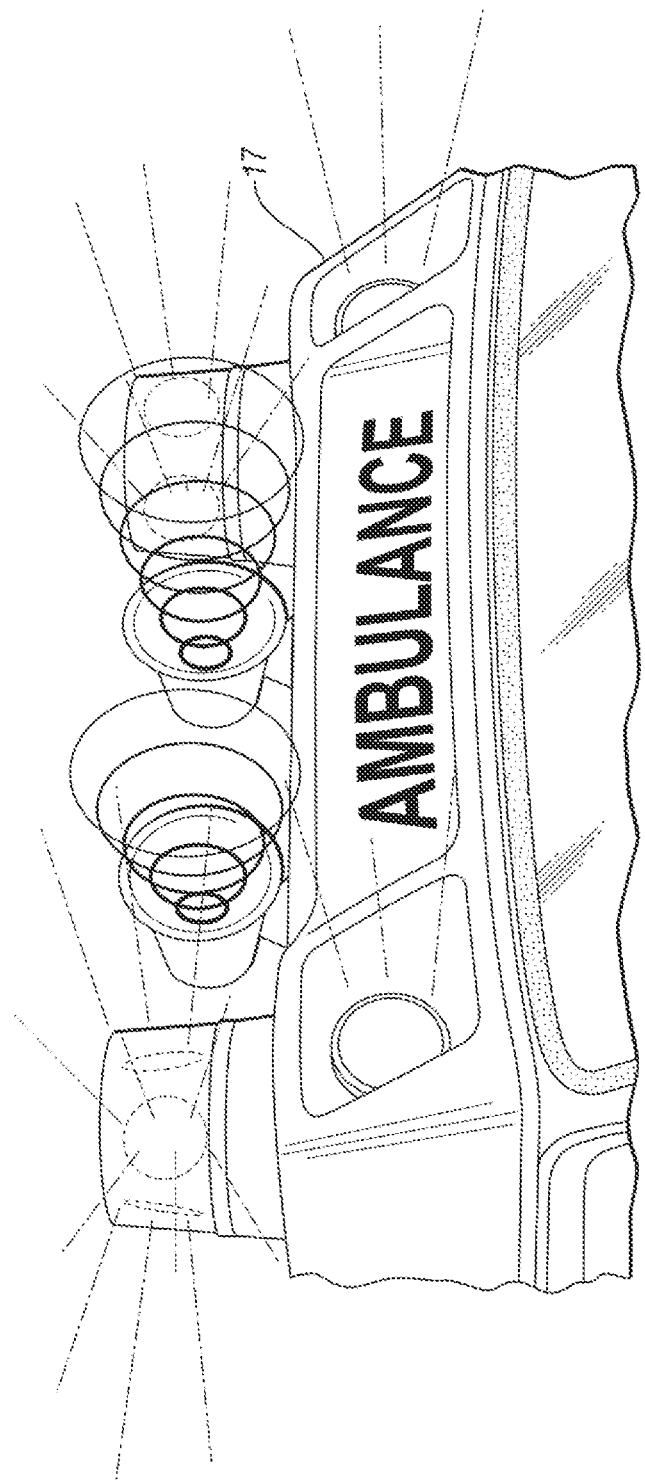
FIG. 2 is a view, partially broken away, of an emergency vehicle in the form of an ambulance which emits audibly and visually perceptible warning signals which are capable of being received by a communication device such as a cellular phone when supported by a docking station within the passenger compartment of the land vehicle or automobile of FIG. 1.
Figure 3:
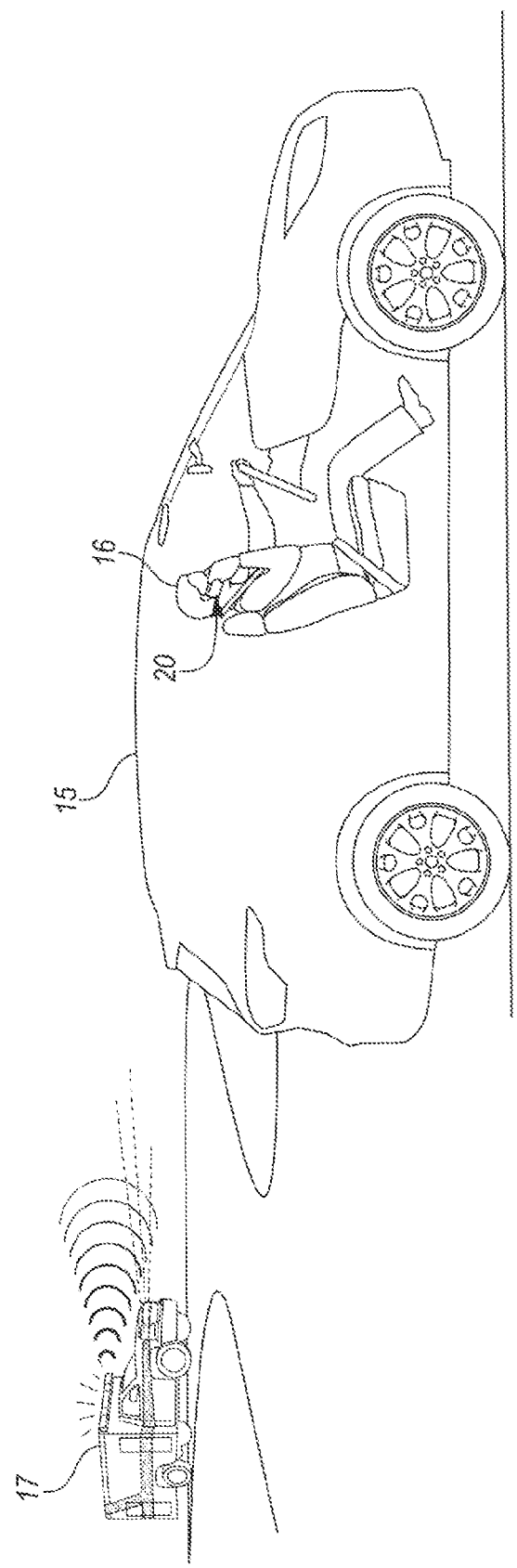
FIG. 3 is a schematic view, partially broken away, of an emergency vehicle which is emitting both audibly and visually perceptible warning signals and a motorist who is both driving an automobile and talking on a cellular phone.
Figure 4:
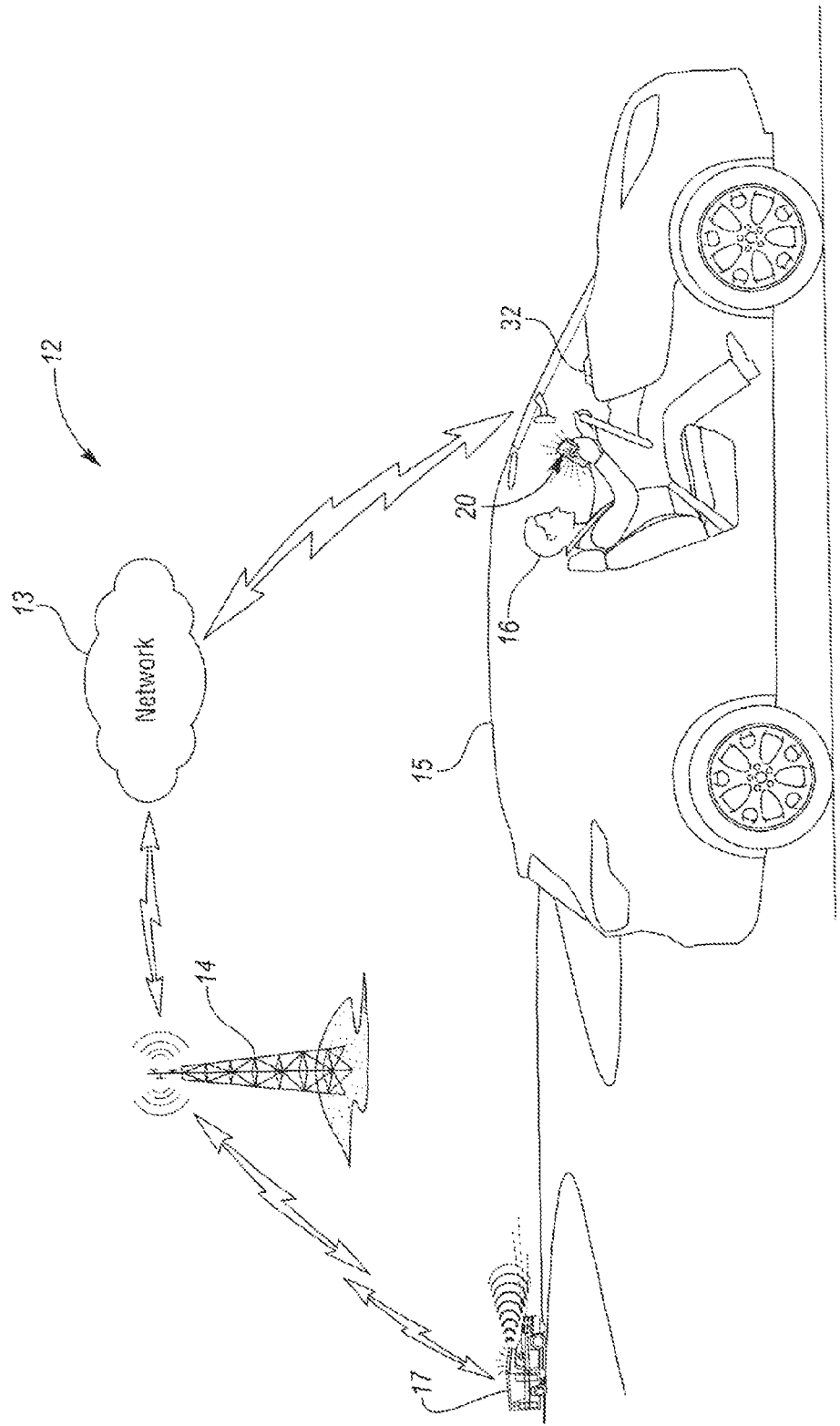
FIG. 4 is a view, similar to the view of FIG. 3, wherein the motorist is receiving a notification signal generated by the cellular phone based on an RF warning signal generated by the emergency vehicle and transmitted over the warning system including the communication network; the notification signal, which may be audible and/or visual, provides an advance warning to the motorist of the approaching emergency vehicle.
Figure 5:
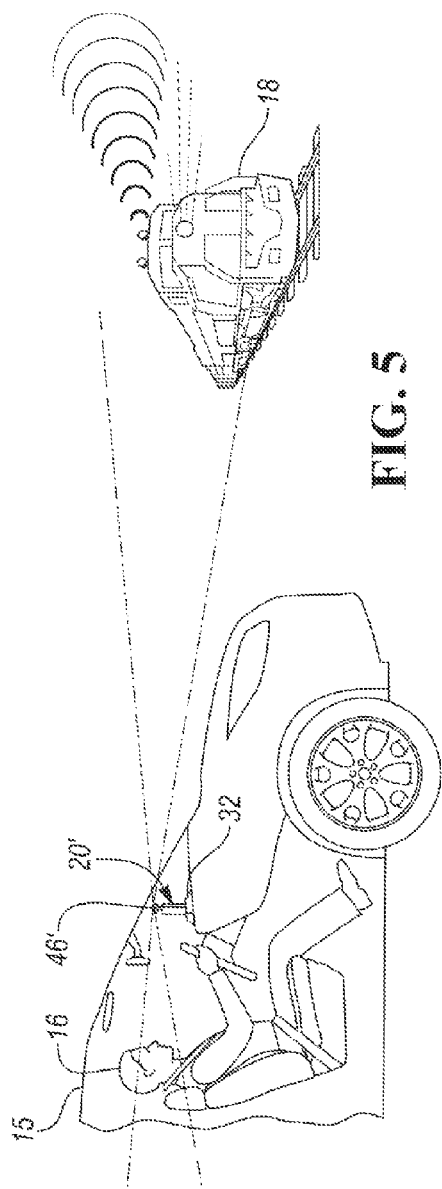
FIG. 5 is a view, similar to the view of FIG. 4, wherein the cellular phone is shown supported by the docking station which is electrically coupled to the electrical system of the land vehicle (as shown in FIG. 13a) so that receivers in the form of a camera and a microphone of the cellular phone are capable of receiving visually and audibly perceptible signals, respectively, emitted by an approaching nearby train.
Figure 6:
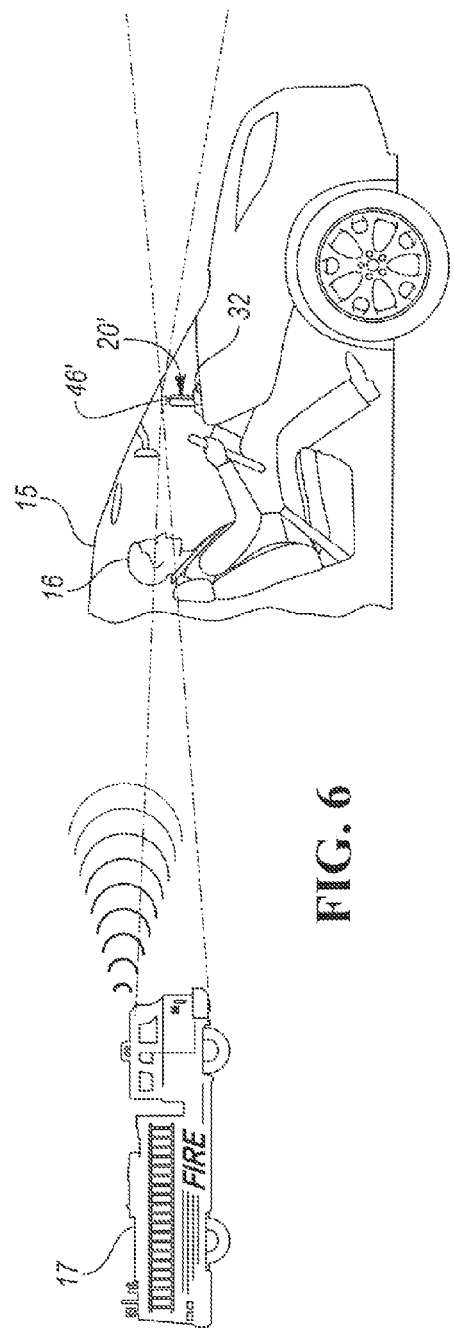
FIG. 6 is a view, similar to the view of FIG. 5, wherein the cellular phone is supported by the docking station to receive visually and audibly perceptible signals emitted by an emergency vehicle in the form of a fire truck approaching from the rear of the land vehicle, the cellular phone can receive such perceptible signals coming from not only the front of the land vehicle but also from the sides and the rear of the land vehicle.
Figure 9:
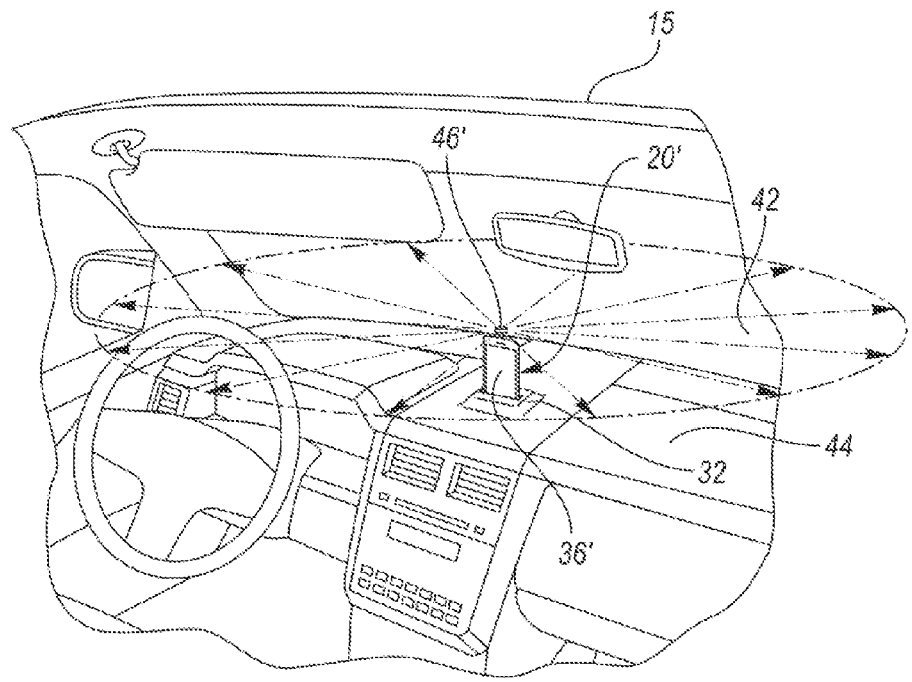
FIG. 9 is a view, partially broken away, of a vehicle interior wherein the cellular phone is supported by the docking station which, in turn, is supported on the vehicle's instrument panel and wherein an imaging assembly of the cellular phone can include either a camera having a super wide-angle lens system, or omnidirectional image capturing apparatus (i.e. to create a panoramic image) or a panoramic imaging system.
Figure 10:
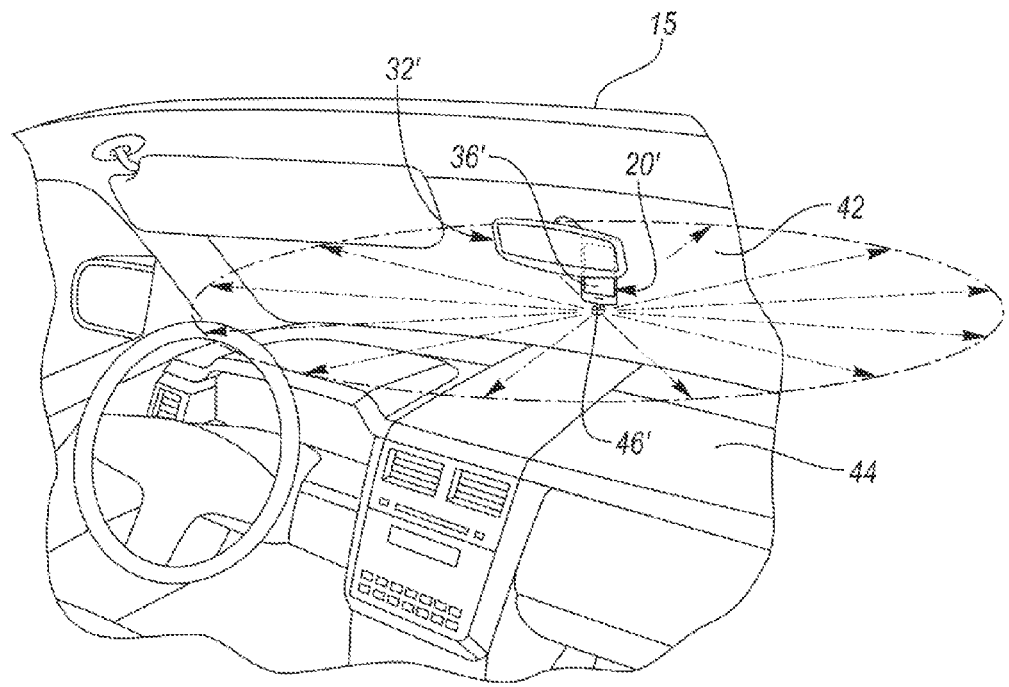
FIG. 10 is a view, similar to the view of FIG. 9, wherein the docking station is located at the back portion of a rear view mirror assembly of the vehicle.
Figure 11:
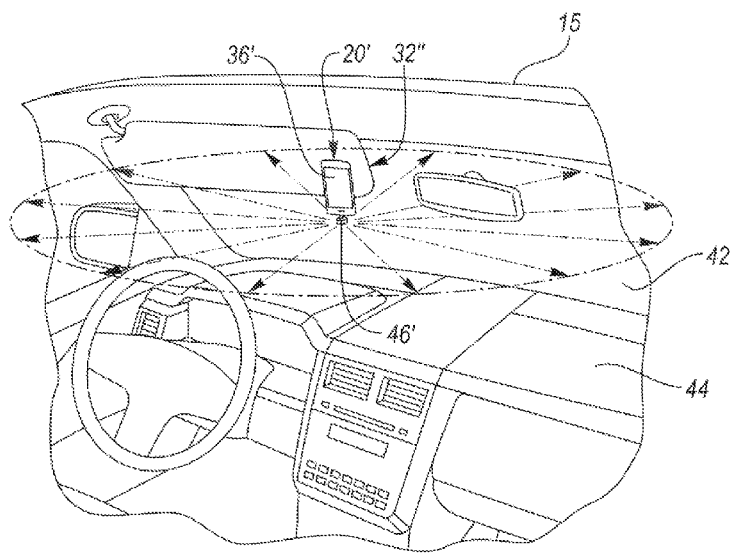
FIG. 11 is a view, similar to the views of FIGS. 9 and 10, wherein the docking station is located at a sun visor assembly of the vehicle.
Figure 13A:
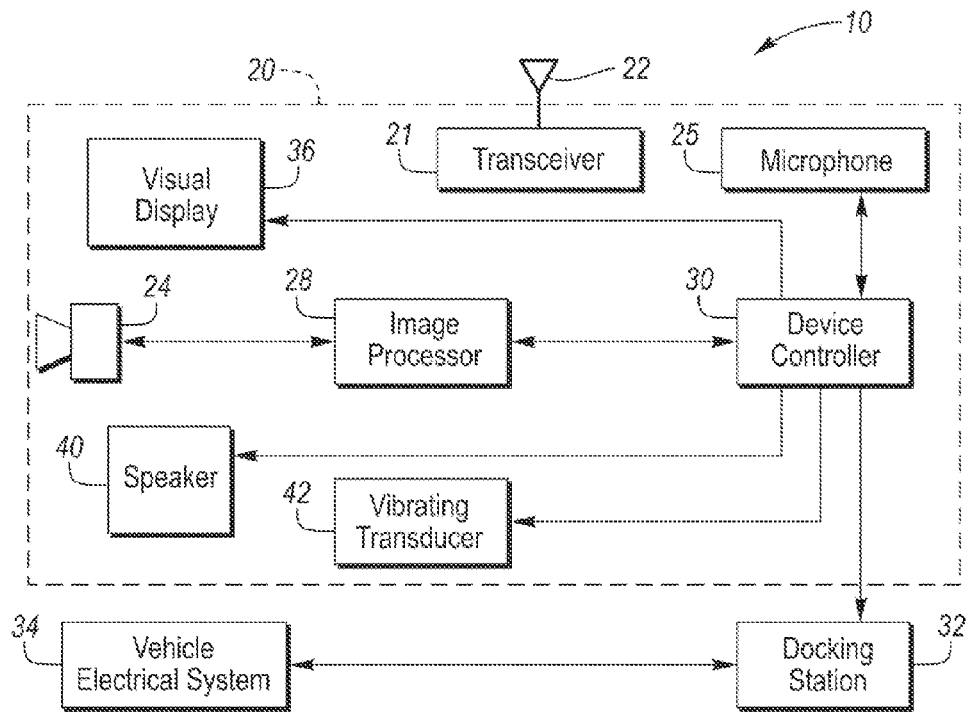
FIG. 13A is a block diagram schematic view of the cellular phone coupled to the docking station and, in turn, to the vehicle electrical system.

Referring now to the drawing figures, there is illustrated in FIG. 13A an apparatus, generally indicated at 10, for use in a warning system, generally indicated at 12 in FIGS. 1 and 4, including a cellular communications network 13 and cellphone towers 14 to notify a land vehicle 15 or motorist 16 of the vehicle 15 of an approaching or nearby emergency vehicle 17 (FIGS. 1, 2, 3, 4, 6, 7 and 8) or train 18 (FIG. 5).

The apparatus 10 generally includes a docking station 32 and a communication device or cellular phone, generally indicated at 20 (and generally indicated at 20' in FIGS. 5-12). The cellular phone 20 or 20' including a first receiver or transceiver 21 to receive RF warning signals via an antenna 22 transmitted from outside the land vehicle 15 and a second receiver in the form of a camera 24 and/or a microphone 25 to receive perceptible warning signals such as visually and/or audibly perceptible signals transmitted by the emergency vehicle 17 or train 18.

The docking station 32 supports the device 20 or 20' within a passenger compartment of the land vehicle 15 so that the first and second receivers are capable of receiving the RF and perceptible warning signals, respectively.

Also, the apparatus 10 includes control logic either partially or completely contained within a device controller 30 (FIG. 13A) or partially or completely contained within the vehicle electrical system 34. The control logic may be hardware, software or a combination of hardware and software. The control logic is coupled to the device 20 or 20' to generate a notification signal in the form of visual and/or audible and/or vibrating signals based on the warning signals. The notification signal provides advance warning to the motorist 16 or the land vehicle 15 of the approaching or nearby emergency vehicle 17 or train 18.

Figure 13B:
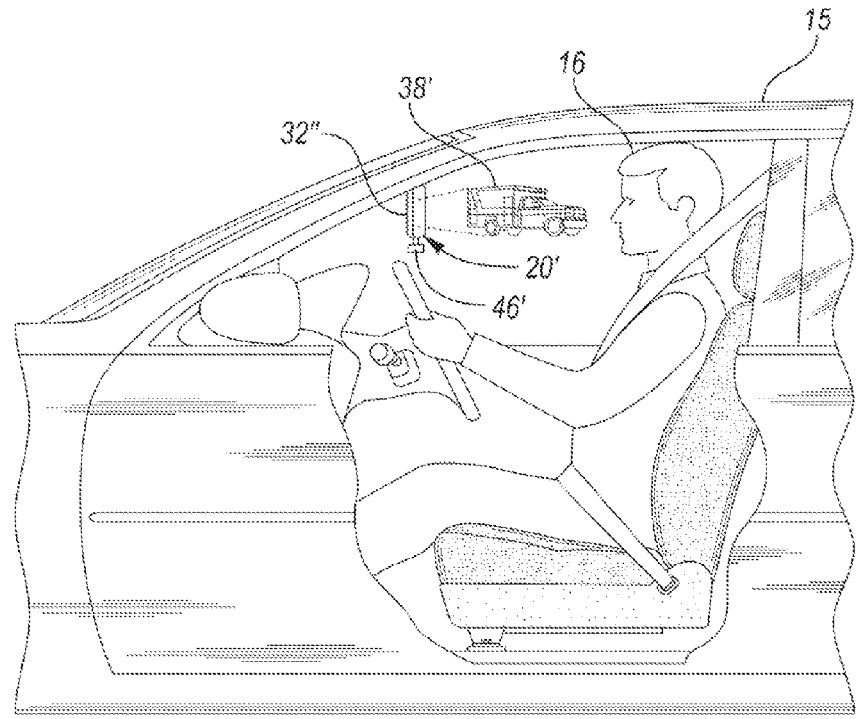
FIG. 13B is a view, partially broken away and similar to the view of FIG. 11, wherein the cellular phone includes a visual display in the form of a light-field or holographic display to provide visual information in the form of a 3D image regarding an approaching emergency vehicle such as an ambulance.

The device 20 or 20' includes a visual display or screen 36 or 36', respectively, to provide visual information regarding the emergency vehicle 17 or train 18 to the motorist 16 based on the notification signal. The visual display 36' may be a light-field or holographic display and the visual information may be a 3D image 38' as shown in FIG. 13B. The 3D image 38' may not only show the particular emergency vehicle but also the direction in which it is traveling.

The device 20 may include a speaker 40 (FIG. 13A) or transducer to provide an acoustical signal to the motorist 16 based on the notification signal.

The device 20 may include a vibratory transducer 42 to vibrate based on the notification signal.

Some of the perceptible warning signals are typically visually perceptible wherein the device 20 includes an imaging assembly including a camera 24 to image the visually perceptible signals to obtain a set of images and an image processor 28 to process the set of images which, in turn, are communicated to the device controller 30.

Some of the perceptible warning signals are preferably audibly perceptible wherein the device 20 includes a transducer or microphone 25 for converting the audibly perceptible signals into electrical signals.

The docking station 32 may be electrically coupled to the vehicle's electrical system 34 as shown in FIG. 13A.

The device 20 or 20' may comprise a cellular phone or other communication device configured to transmit and receive cell phone signals. The RF warning signals may include a signal which indicates that the emergency vehicle 17 or train 18 is located within a cell in which the land vehicle 15 is located.

Figure 12:
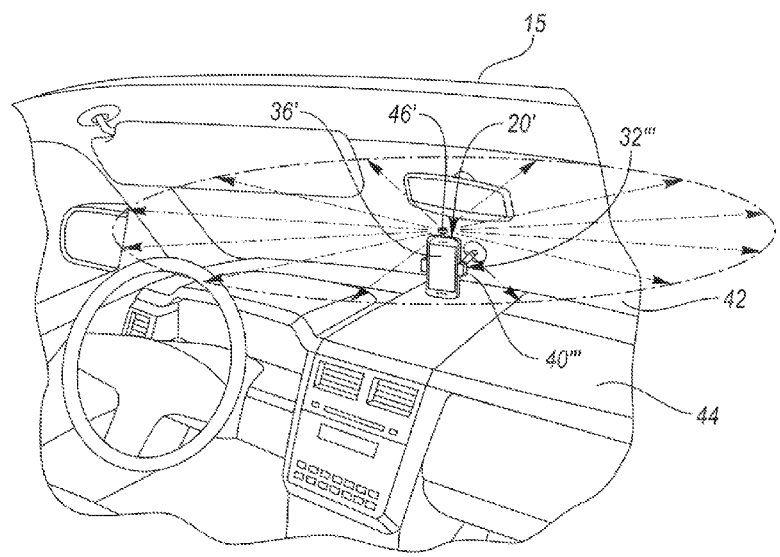
FIG. 12 is a view, similar to the views of FIGS. 9-11, wherein the docking station is located at and is removably secured at the inner surface of a front windshield of the vehicle and wherein communication between the cellular phone and the vehicle's electrical system is wireless, such as Bluetooth®.

The docking station 32''' of FIG. 12 may include a device holder 40''' supported in spaced relationship relative to an interior component such as a windshield 42 or an instrument panel 44 of the vehicle 15.

The camera 24 may have a wide-angle lens system, an omnidirectional image capturing apparatus 46' (FIGS. 5-12 and FIG. 13B) to create a panoramic image or a panoramic imaging system to capture images at the back, front and sides of the vehicle 15.

The cellular system is typically operated by a cell phone carrier within a geographic area divided into a plurality of cells. The cellular system may include a database of data which identifies which cells the cell phones are located. The cellular system may further include a plurality of base stations. Each of the base stations may be configured to transmit and receive cell phone signals including a general, wake-up signal which indicates an emergency vehicle 17 or train 18 is traveling within a first cell of the geographic area. The wake-up signal typically is received by all activated cell phones 20 or 20' within the first cell to wake-up the activated cell phones so the phones are alerted to and will be responsive to receive perceptible warning signals emitted by emergency vehicles 17 or trains 18.

As previously mentioned, the camera 24 and the image processor 28 receive and process images of the emergency vehicle 17 or train 18 and the device or cell phone 20 or 20' is controlled by the device controller 30 based on the processed images.

As previously mentioned with respect to FIG. 13B, the cell phone 20 or 20' may have the ability to generate and display the images as a realistic, three-dimensional image 28', (i.e., as a light-field or a holographic image). Therefore, as the motorist 16 moves his/her head around, the holographic image 38' appears to change just as the image of a real object changes. Such systems (which may include an eye-tracking subsystem) are disclosed in published U.S. patent application 2014/0146133. Such systems are also disclosed in U.S. Pat. No. 9,201,270 and published in U.S. patent application No. 2013/0321581 assigned to Leia Inc. of Menlo Park, Calif. and Ostendo Technologies, Inc. of Carlsbad, Calif.

As previously mentioned, the cell phone 20' may include (as discussed in U.S. patent application No. 2012/0262540) the panoramic, view-imaging apparatus 46'. The apparatus 46' typically includes a housing, a concave panoramic reflector, a support structure configures to hold the concave panoramic reflector in a fixed position with respect to the housing, and a mounting device for positioning the housing in a fixed orientation with respect to the cellular phone 20' such that light reflected by the concave panoramic reflector is directed to a light sensor of the camera in the cellular phone 20'.

Alternatively, the cell phone 20' may include (as disclosed in U.S. patent application No. 2013/0235149) an image capturing apparatus for capturing an image of a subject using a plurality of imaging devices and a plurality of lenses for the imaging devices, respectively. A single image processor is configures to perform predetermined image processing on the images.

Yet still alternatively, the cell phone 20' may include (as described in U.S. Pat. No. 8,659,841) a super-wide angle lens system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for use in a warning system to notify a land vehicle or a motorist of the vehicle of an approaching or nearby emergency vehicle or train, the apparatus comprising:
   a docking station;
   a communication device including a first receiver to receive RF warning signals transmitted from the nearby emergency vehicle outside the land vehicle and a second receiver to receive perceptible warning signals transmitted by the emergency vehicle or train, the docking station supporting the device within a passenger compartment of the land vehicle so that the first and second receivers are capable of receiving the RF and perceptible warning signals, respectively, and further including a visual display to provide visual information in a form of a 3D image regarding the emergency vehicle or train to notify the land vehicle or the motorist based on a notification signal; and
   control logic coupled to the device to generate the notification signal based on the warning signals, the notification signal providing advance warning to the motorist or the land vehicle of the approaching or nearby emergency vehicle or train.

2. The apparatus as claimed in claim 1, wherein the visual display is a light-field or holographic display.

3. The apparatus as claimed in claim 1, wherein the device includes a speaker or transducer to provide an acoustical signal to the motorist based on the notification signal.

4. The apparatus as claimed in claim 1, wherein the device includes a vibrating transducer to vibrate based on the notification signal.

5. The apparatus as claimed in claim 1, wherein the perceptible warning signals are visually perceptible and wherein the device includes an imaging assembly to image the visually perceptible signals to obtain a set of images and an image processor to process the set of images.

6. The apparatus as claimed in claim 5, wherein the imaging assembly includes a camera having a super wide-angle lens system.

7. The apparatus as claimed in claim 5, wherein the imaging assembly includes an omnidirectional image capturing apparatus to create a panoramic image.

8. The apparatus as claimed in claim 5, wherein the imaging assembly includes a panoramic imaging system.

9. The apparatus as claimed in claim 1, wherein the perceptible warning signals are audibly perceptible and wherein the device includes a transducer for converting the audibly perceptible signals into electrical signals.

10. The apparatus as claimed in claim 1, wherein the docking station is adapted for coupling to an electrical system of the vehicle.

11. The apparatus as claimed in claim 1, wherein the device comprises a cellular phone configured to transmit and receive cell phone signals.

12. The apparatus as claimed in claim 11, wherein the RF warning signals include a signal which indicates that the emergency vehicle or train is located within a cell in which the land vehicle is located.

13. The apparatus as claimed in claim 1, wherein the docking station includes a device holder supported in spaced relationship relative to an interior component of the vehicle.

14. Apparatus for use in a warning system to provide advance warning of an approaching or nearby emergency vehicle or train, the apparatus comprising:
   a hand-held communication device including a first receiver to receive RF warning signals transmitted from the nearby emergency vehicle and a second receiver to receive perceptible warning signals transmitted by the emergency vehicle or train;
   control logic coupled to the device to generate a notification signal based on the warning signals, the notification signal providing advance warning of the approaching or nearby emergency vehicle or train; and
   a visual display to provide visual information in a form of a 3D image regarding the emergency vehicle or train to notify the land vehicle or the motorist based on the notification signal.

15. The apparatus as claimed in claim 14, wherein the visual display is a light-field or holographic display.

16. Apparatus for use in a warning system to notify a land vehicle or a motorist of the vehicle of an approaching or nearby emergency vehicle or train, the apparatus comprising:

a docking station;

a cellular phone including a first receiver to receive visually perceptible warning signals transmitted by the emergency vehicle or train and a second receiver to receive audibly perceptible warning signals transmitted by the emergency vehicle or train, the docking station supporting the cellular phone within a passenger compartment of the land vehicle so that the first and second receivers are capable of receiving the visually and audibly perceptible warning signals, respectively;

control logic coupled to the receivers to generate a notification signal based on the visually and audibly perceptible warning signals, the notification signal providing advance warning to the motorist or the land vehicle of the approaching or nearby emergency vehicle or train; and a visual display to provide visual information in the form of a 3D image regarding the emergency vehicle or train to notify the land vehicle or the motorist based on the notification signal.

17. The apparatus as claimed in claim 16, wherein the cellular phone includes the visual display.

18. The apparatus as claimed in claim 16, wherein the visual display is a light-field or holographic display.

* * * * *